(12) United States Patent
Alstad

(10) Patent No.: US 8,166,114 B2
(45) Date of Patent: Apr. 24, 2012

(54) ASYNCHRONOUS CONTEXT DATA MESSAGING

(75) Inventor: Kent Alstad, Langley (CA)

(73) Assignee: Strangeloop Networks, Inc., Vancouver, BC (CA)

( * ) Notice: Subject to any disclaimer, the term of this patent is extended or adjusted under 35 U.S.C. 154(b) by 368 days.

(21) Appl. No.: 11/623,028

(22) Filed: Jan. 12, 2007

(65) Prior Publication Data

US 2007/0209040 A1    Sep. 6, 2007

Related U.S. Application Data

(63) Continuation-in-part of application No. 11/359,637, filed on Feb. 21, 2006.

(51) Int. Cl.
*G06F 15/16* (2006.01)
(52) U.S. Cl. ......... 709/206; 709/201; 709/203; 709/227
(58) Field of Classification Search .......... 709/204–207
See application file for complete search history.

(56) References Cited

U.S. PATENT DOCUMENTS

| | | | |
|---|---|---|---|
| 5,564,070 A | 10/1996 | Want | |
| 5,784,562 A * | 7/1998 | Diener | 709/217 |
| 6,038,601 A | 3/2000 | Lambert et al. | |
| 6,370,687 B1 | 4/2002 | Shimura | |
| 6,385,641 B1 | 5/2002 | Jiang et al. | |
| 6,604,143 B1 | 8/2003 | Nager et al. | |
| 6,618,751 B1 | 9/2003 | Challenger et al. | |
| 6,839,741 B1 | 1/2005 | Tsai | |
| 7,043,460 B2 | 5/2006 | Deboer et al. | |
| 7,139,780 B2 | 11/2006 | Lee et al. | |
| 7,194,522 B1 | 3/2007 | Swildens et al. | |
| 7,266,595 B1 | 9/2007 | Black et al. | |
| 7,295,953 B2 | 11/2007 | Cox et al. | |
| 7,392,294 B2 | 6/2008 | Hellstrom | |
| 7,398,304 B2 | 7/2008 | Smith et al. | |
| 7,469,280 B2 | 12/2008 | Simpson | |

(Continued)

FOREIGN PATENT DOCUMENTS

NZ    566291    2/2008

(Continued)

OTHER PUBLICATIONS

Jung, Gueyoung, et al. "Generating Adaptation Policies for Multi-Tier Applications in Consolidated Server Environments", in Proceedings of the 5th IEEE International Conference on Automonic Computing, Jun. 2-6, 2008, pp. 23-32.

(Continued)

*Primary Examiner* — Ian N Moore
*Assistant Examiner* — Jackie Zuniga
(74) *Attorney, Agent, or Firm* — Raubvogel Law Office

(57) ABSTRACT

An acceleration engine that stores context data is operatively disposed between a network and at least one web server. Incoming requests from the network are inspected by the acceleration engine and passed on to the web server. If the inspection reveals a reference to context data, the acceleration engine retrieves the context data and asynchronously sends the context data to the web server. The web server synchronizes that request and context data and generates a response message accordingly. The response message is forwarded back to the initiator of the request with or without interception by the acceleration engine. Should context data be generated during processing of the request, such context data is sent to the acceleration engine for updating purposes.

33 Claims, 7 Drawing Sheets

U.S. PATENT DOCUMENTS

| | | | |
|---|---|---|---|
| 7,865,585 B2 | 1/2011 | Samuels et al. | |
| 7,895,256 B2 | 2/2011 | Zombek et al. | |
| 8,001,175 B2 | 8/2011 | Betancourt et al. | |
| 2002/0065899 A1 | 5/2002 | Smith et al. | |
| 2002/0156881 A1 | 10/2002 | Klopp Lemon et al. | |
| 2003/0004937 A1 | 1/2003 | Salmenkaita et al. | |
| 2003/0040995 A1* | 2/2003 | Daddario et al. | 705/35 |
| 2003/0065810 A1 | 4/2003 | Ims et al. | |
| 2003/0078964 A1 | 4/2003 | Parrella, Sr. et al. | |
| 2003/0204769 A1* | 10/2003 | Coughlin | 714/4 |
| 2003/0225897 A1 | 12/2003 | Krawetz | |
| 2004/0043758 A1 | 3/2004 | Sorvari et al. | |
| 2004/0117438 A1 | 6/2004 | Considine et al. | |
| 2004/0205165 A1* | 10/2004 | Melamed et al. | 709/219 |
| 2004/0236824 A1 | 11/2004 | Millington et al. | |
| 2004/0268357 A1 | 12/2004 | Joy et al. | |
| 2005/0033855 A1 | 2/2005 | Moradi et al. | |
| 2005/0108335 A1 | 5/2005 | Naick et al. | |
| 2005/0138033 A1 | 6/2005 | Katta | |
| 2005/0188048 A1 | 8/2005 | Yuan et al. | |
| 2005/0210243 A1 | 9/2005 | Archard et al. | |
| 2005/0261985 A1* | 11/2005 | Miller et al. | 705/26 |
| 2006/0015512 A1 | 1/2006 | Alon et al. | |
| 2006/0095527 A1 | 5/2006 | Malik | |
| 2006/0143290 A1* | 6/2006 | Dostert et al. | 709/224 |
| 2006/0212149 A1 | 9/2006 | Hicken et al. | |
| 2006/0212601 A1 | 9/2006 | Hampton | |
| 2006/0224723 A1 | 10/2006 | Chen | |
| 2006/0225065 A1 | 10/2006 | Chandhok et al. | |
| 2007/0005603 A1 | 1/2007 | Jain et al. | |
| 2007/0174644 A1 | 7/2007 | Willig | |
| 2007/0180035 A1 | 8/2007 | Liu et al. | |
| 2007/0260748 A1 | 11/2007 | Talkington | |
| 2007/0268865 A1 | 11/2007 | Garcia et al. | |
| 2007/0291741 A1 | 12/2007 | Hwang | |
| 2008/0008109 A1 | 1/2008 | Ollis | |
| 2008/0016240 A1 | 1/2008 | Balandin | |
| 2009/0132658 A1 | 5/2009 | Glickstein | |

FOREIGN PATENT DOCUMENTS

| | | |
|---|---|---|
| WO | 0186494 | 11/2001 |

OTHER PUBLICATIONS

"Optimize caching". Retrieved from: http://code.google.com/speed/page-speed/docs/caching.html.

"Seam Framework—HTTP client-server optimization strategies". Retrieved from: http://seamframework.org/Documentation/HTTPClientserverOptimizationStrategies.

Xue Liu et al., "On-line Response Time Optimization of Apache Web Server", Proceedings of the 11th international conference on Quality of service, 2003, Springer-Verlag, pp. 461-478.

* cited by examiner

ASYNCHRONOUS CONTEXT DATA MESSAGING

CROSS-REFERENCE TO RELATED APPLICATIONS

The present application is a continuation-in-part, under 35 U.S.C. §120, of co-pending U.S. patent application Ser. No. 11/359,637, filed on Feb. 21, 2006 and entitled "Storing and Retrieving User Context Data", the entirety of which is hereby incorporated by reference.

BACKGROUND

On the World Wide Web (i.e., the "web"), it is frequently desirable for websites to store information relating to a specific user and/or user computer. In many applications, it is necessary, or at least desirable, to associate a user computer with context data relating to previous interactions with that same user computer. For example, a user may indicate certain preferences regarding the display of a particular website, and it may be desirable to associate those preferences with the user computer for future visits. However, the standard protocol for transferring web pages—the HyperText Transport Protocol (HTTP)—has a limited capability for storing user computer-specific context data across visits.

Known methods for storing user computer-specific context data built into HTTP usually involve storing a small segment of data, called a "magic cookie" (or simply "cookie") on the user computer. Cookies form the building blocks for most user computer-specific context data storage on the web, but they have several limitations. Cookies are limited in size, finite in quantity, and can be arbitrarily modified or deleted by the user. They also pose privacy and security concerns, which limit their suitability for storage of many kinds of context data that would be desirable to store. For example, it may be desirable for a website to automatically store a user's personal information for the purpose of facilitating future visits from the same user, but storing the user's personal information in a cookie makes the information potentially vulnerable to disclosure or malicious modification by other programs or websites, yielding an undesirable result.

Other techniques for storing data on the user computer include ASP.NET View State, hidden form fields, and URL query strings. However, these techniques are limited in the amount of data they can store and many of them threaten the security of the user computer when used to store critical data.

To address these concerns, many web servers use cookies (or other techniques) to store index data in the user computer. This index data is then used to retrieve the user computer-specific context data from a database of context data stored at the web server. The user computer-specific context data can be stored securely at the web server while still being uniquely associated with various user computers through use of cookies.

While the technique of using index data contained in cookies to retrieve context data stored at the web server is an improvement over storing context data in cookies directly, it introduces several other problems when put into practice.

Web servers are highly active systems with many processes running in parallel. It is quite common for web servers to crash, freeze, restart, or slow due to high volume of traffic. These events can make the website and any stored context data unavailable for a period of time, and, in some cases, result in the loss of context data entirely.

Now referring to FIG. 1, to alleviate the effect of server failure, it is common for websites to be hosted on multiple web servers 24, 26, 28. Many websites receive such a high volume of page requests that without hosting them on multiple web servers, the response time to page requests would be intolerable. Having multiple web servers 24, 26, 28 reduces the likelihood that the website will become unavailable due to a server failure and increases the overall capability of the system to handle a high volume of page requests received via some network 20 from one or more user computers 12, 14, 16, 18. A load balancer 22 has been known to be implemented for evenly assigning incoming web page requests to one of the array of web servers 24, 26, 28. Load balancing techniques are designed to smooth the response to page requests despite server delays or failures.

However, load balancing does not address the problem of potential context data loss due to server failure. If context data is stored on a web server that fails, load balancing techniques may be able to continue web service without interruption, but the context data stored on that web server may be lost. Load balancing alone does not protect context data from server loss.

Furthermore, storing context data on web servers may hinder load balancing. If the user computer-specific context data is stored on a certain web server, it is necessary that return visits by the user computer be handled by the same web server so as to facilitate retrieval of the context data. Thus, the user computer remains associated with a particular web server, even though load conditions may have changed, causing another server to have greater availability of capacity. This static association between a user computer and a web server reduces the effectiveness of load balancing. Load balancing techniques have difficulty assigning page requests to web servers evenly when a large portion of incoming page requests must necessarily be assigned to a specific web server.

Additionally, storing context data on a web server poses challenges for maintaining or upgrading the web server, as context data can persist for long periods of time and it is not generally known when the return of a certain user computer will necessitate access to certain context data. Thus, referring again to FIG. 1, context data has been known to be stored in a context data store 30 external to the web servers 24, 26, 28. However, storing context data external to one or more of the web servers 24, 26, 28 introduces several extra steps. In order to process a request, a web server must receive the request, determine the need for context, request the context data from the external context data store 30, wait for a response, process that response, write the updated context data back to the external context data store 30, and finally return the web request. These extra steps introduce delay, complexity, and the potential for failure.

SUMMARY

According to at least one aspect of one or more embodiments of the present invention, a method for handling network messages includes receiving a request message from a first network module. The method further includes detecting whether the request message references context data. Moreover, the method includes sending the request message to a second network module. The method, in response to a positive detection of the request message referencing context data, additionally includes conditionally retrieving the context data and sending the context data to the second network module, where the sending of the request message and the sending of the context data are asynchronous. It is noted that as used herein, the term "module" refers to any program, logic, and/or functionality implemented in hardware, software, and/or firmware.

According to at least one other aspect of one or more embodiments of the present invention, in an enhanced network module, a method for handling network messages includes receiving a network message from a first network module. The method further includes inspecting the network message and sending the network message to a second network module. Moreover, the method, in response to the inspection, includes determining whether the network message references context data. Additionally, the method, in response to a positive determination, includes conditionally retrieving the context data from a data store operatively connected to the enhanced network module and sending the context data to the second network module.

According to at least one other aspect of one or more embodiments of the present invention, a system includes an acceleration engine operatively disposed between a network and at least one web server. The acceleration engine includes: a first module arranged to inspect a request message received from the network; a second module arranged to send the request message to the at least one web server; a third module arranged to conditionally retrieve context data from a data store in response to the inspection of the request message; and a fourth module arranged to conditionally send the context data to the at least one web server in a manner that is asynchronous with the sending of the request message to the at least one web server.

The features and advantages described herein are not all inclusive, and, in particular, many additional features and advantages will be apparent to those skilled in the art in view of the following description. Moreover, it should be noted that the language used herein has been principally selected for readability and instructional purposes and may not have been selected to circumscribe the present invention.

Each of the figures referenced above depict an embodiment of the present invention for purposes of illustration only. Those skilled in the art will readily recognize from the following description that one or more other embodiments of the structures, methods, and systems illustrated herein may be used without departing from the principles of the present invention.

DETAILED DESCRIPTION

In the following description of embodiments of the present invention, numerous specific details are set forth in order to provide a more thorough understanding of the present invention. However, it will be apparent to one skilled in the art that the present invention may be practiced without one or more of these specific details. In other instances, well-known features have not been described in detail to avoid unnecessarily complicating the description.

Figure 1:
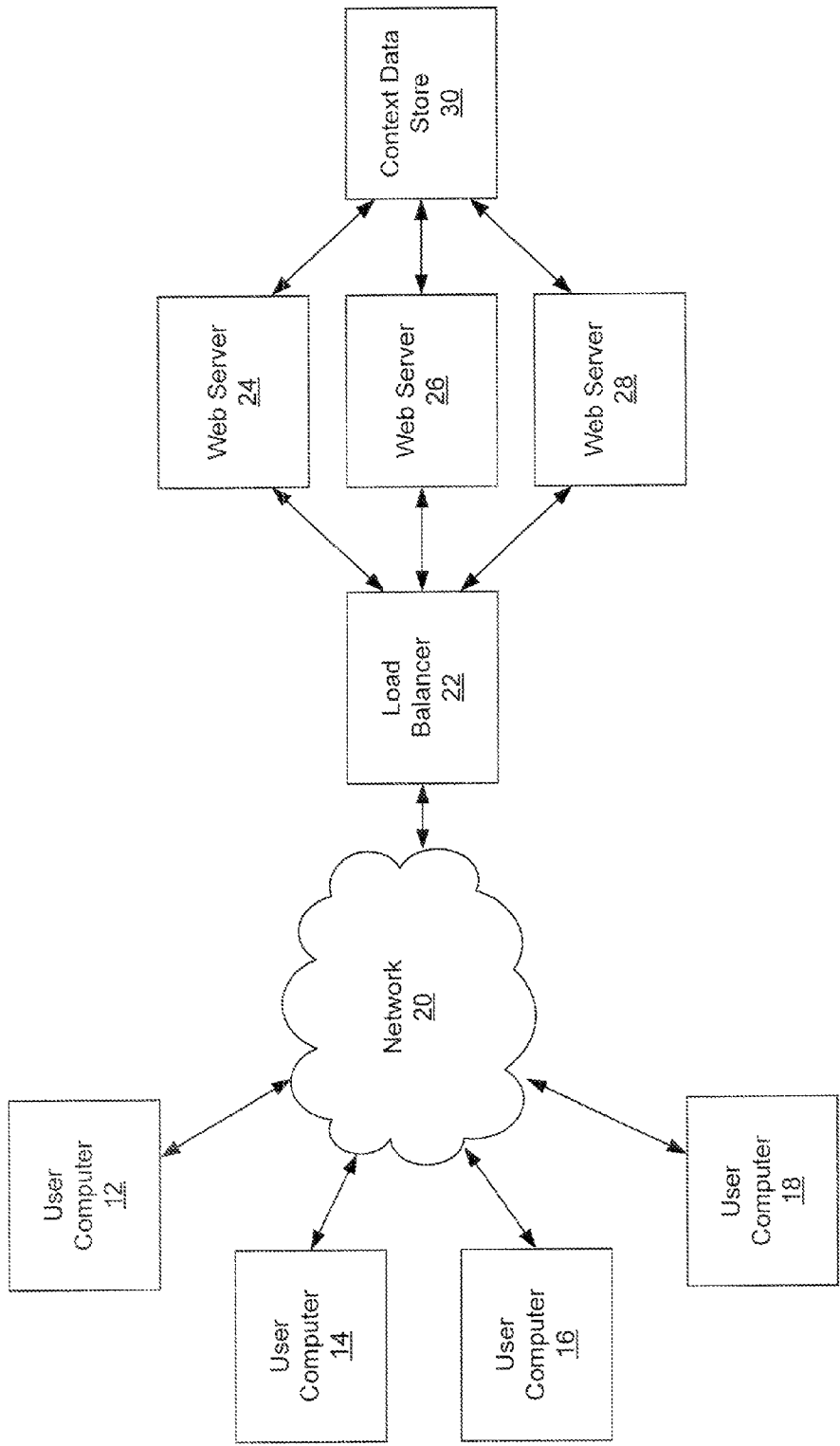
FIG. 1 shows a typical prior art network messaging scheme.
Figure 2:
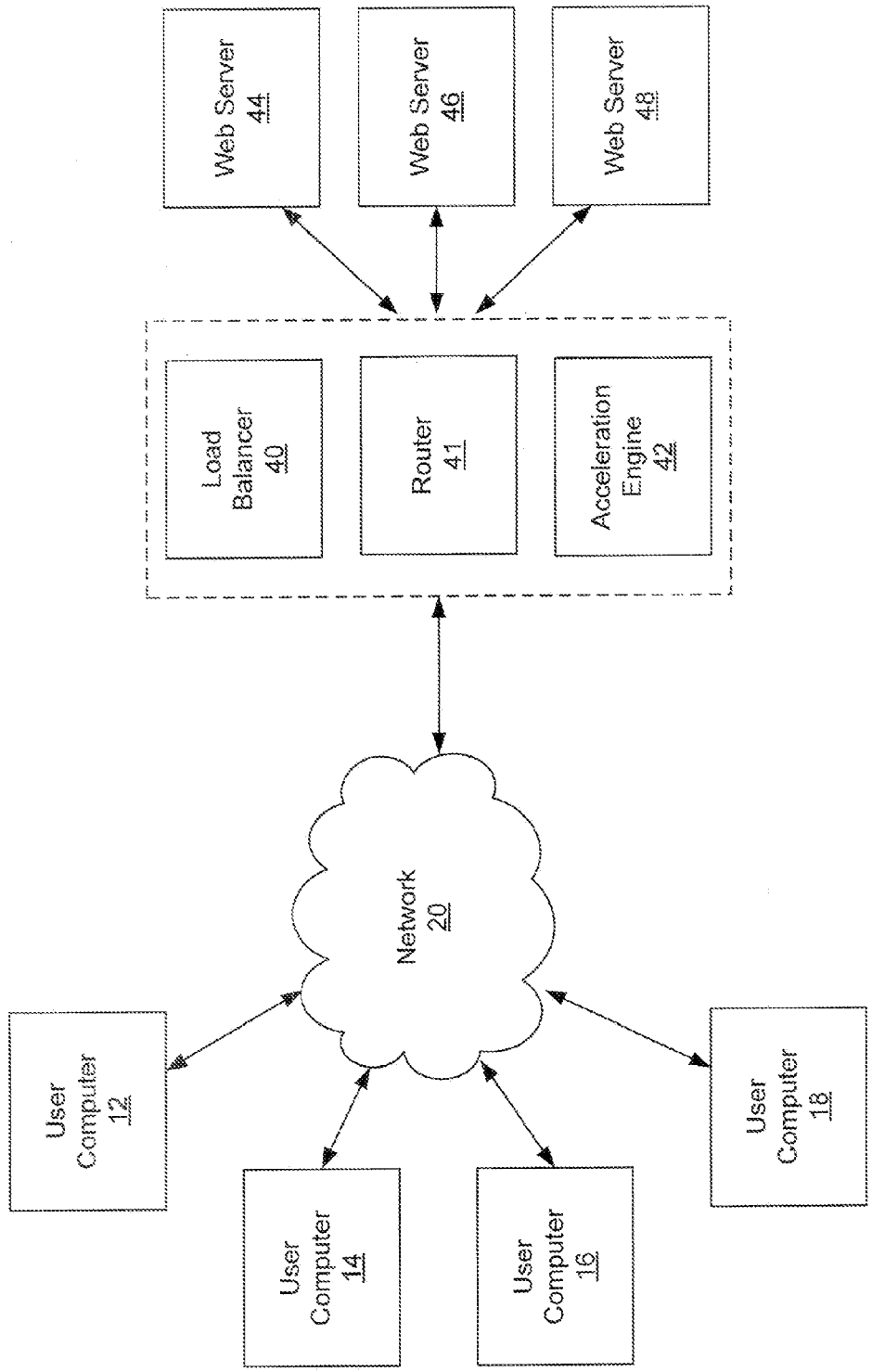
FIG. 2 shows a network messaging scheme in accordance with an embodiment of the present invention.

FIG. 2 shows a network messaging scheme in accordance with an embodiment of the present invention. User computers 12, 14, 16, 18 are essentially terminals that a user can access for, among other things, network services (e.g., weather information, stock market information, personal account information, e-mail). As such, the term "user computer", as used herein, refers to any electronic module (e.g., a physical device, a software instance) capable of sending to and receiving messages from a network. A non-exhaustive list of examples of user computers includes personal desktop computers, laptop/notebook computers, enterprise computing systems, mobile phones, handheld computing devices, personal digital assistants (PDAs), gaming consoles, voice-over-IP (VoIP) phone systems, and portable entertainment systems. One skilled in the art will recognize that any number of devices and/or systems may be implemented to fulfill the role of the "user computer" described herein without departing from the scope of the present invention.

As shown in FIG. 2, each of the user computers 12, 14, 16, 18 is operatively connected to a network 20. In one or more embodiments, the network 20 is a wide area network (WAN) (e.g., the Internet, which is commonly referred to as the "web"). The user computers 12, 14, 16, 18 can access the web via any standard web browser (e.g., Internet Explorer® by Microsoft Corporation). Further, it is noted that the network 20 is not limited to the Internet per se and may be instead or additionally associated with one or more other types of network (e.g., virtual private network (VPN), an enterprise network, an intranet, a local area network (LAN), an extranet).

The user computers 12, 14, 16, 18 may be connected to the network 20 through at least one of several connection devices, including routers, modems, and wireless access points. These connection devices are not shown as such connection devices and methods are well known in the art.

Further, it is noted that data may be communicated according to one or more of various protocols. For example, in an application layer, data may be communicated according to any one or more of the following protocols: DHCP; DNS; FTP; HTTP; IMAP4; IRC; MIME; POP3; SIP; SMTP; SNMP; SSH; TELNET; TLS/SSL; RPC; RTP; SDP; and SOAP. In a transport layer, data may be communicated according to any one or more of the following protocols: TCP; UDP; RSVP; DCCP; and SCTP. In a network layer, data may be communicated according to any one or more of the following protocols: IP; ARP; BGP; ICMP; IGMP; IGP; and RARP. In a data link layer, data may be communicated according to one or more of the following mechanisms: ATM; Bluetooth; Ethernet; FDDI; Frame Relay; GPRS; modems; PPP; and Wi-Fi. In a physical layer, data may be communicated using any or more of the following: Bluetooth RF; Ethernet physical layer; ISDN modems; RS-232; SONET/SDH; USB; and Wi-Fi.

Via connection to the network 20, user computers 12, 14, 16, 18 can access a website (or websites) hosted by one or more of web servers 44, 46, 48 (described in further detail below with reference to FIG. 4). Web servers 44, 46, 48 are physical devices and/or software instances capable of receiving a request for data and transmitting data in response. For example, one or more of the web servers 44, 46, 48 may be an HTTP server capable of receiving page requests and returning web pages according to the HTTP. As another example, one or more of the web severs 44, 46, 48 may be any server capable of sending datagrams according to a protocol (e.g., User Datagram Protocol (UDP), Transmission Control Protocol (TCP)). Moreover, one or more of the web servers 44, 46, 48 may consist of multiple physical devices or software instances, which in conjunction have the capabilities of a single web server or several web servers.

Further, one or more of the web servers 44, 46, 48 may be implemented using at least one of the many devices commonly available for responding to data requests. For example, one or more of the web servers 44, 46, 48 may be implemented using a standard personal computer (PC) and software such as Apache HTTP Server. One or more of the web servers 44, 46, 48 may also be implemented, for example, using Microsoft® Internet Information Server, ASP.NET 2.0, ASP.NET 1.1, Classic ASP, JSP, IBM® Websphere, Ruby on Rails, or Linux Apache PHP. Moreover, one or more of the web servers 44, 46, 48 may be implemented as online gaming servers. Those skilled in the art will recognize that these examples are not intended to be exhaustive and that other implementations of web servers may be used in one or more embodiments.

As described above, interaction with a website hosted by one or more of the web servers 44, 46, 48 may result in generating context data. Context data may be associated with a specific user and/or a specific user computer. Some computer systems support multiple users on the same computer, and some users may use multiple computers. One or more embodiments are equally applicable to both user-specific context data and user computer-specific context data. For ease of reference herein, all such context data will be referred to as user computer-specific context data without limiting the scope of the invention.

Context data may be any data that is desirable to have available when a user or user computer makes a future data request. For example, it may be desirable for a web server to store shopping cart information relating to a specific user, for a file server to store a history of file accesses relating to a specific user computer, or for a game server to store gameplay information relating to a specific user. Further, context data may come in many forms, and one or more embodiments are applicable to all such forms. Those skilled in the art will recognize that other forms of context data having other uses may be stored and/or processed according to the techniques described herein without departing from the essential characteristics of the various embodiments described herein.

Context data may be associated with a specific user or user computer via use of index data stored in one or more of the user computers 12, 14, 16, 18. Once stored, index data may be sent to a web server as a component of future data requests. The index data may be stored on one of the user computers 12, 14, 16, 18 and included in future data requests using a variety of methods. For example, according to one or more embodiments, HTTP cookies may be used to store index data. In other embodiments, HTTP-post hidden form fields, ASP.NET View State fields, and URL query strings may be used to store index data.

Still referring to FIG. 2, a load balancer 40 may be implemented to balance network requests (also referred to herein as "page requests" or "request messages") across the web servers 44, 46, 48. The load balancer 40 is capable of receiving an incoming page request and redirecting it to a particular one of the web servers 44, 46, 48 on the basis of availability of the various web servers 44, 46, 48. For example, if web server 44 is overloaded due to a high volume of page requests, but web server 46 has available request-handling capability, the load balancer 40 directs incoming page requests to web server 46. The load balancer 40 may be implemented using any one of many commonly available load balancing methods. Such methods may involve, for example, random allocation, round-robin allocation, weighted round-robin, least connections, and IP hashing.

A router 41 is also shown in FIG. 2, where the router 41 is capable of receiving an incoming message and repeating it on at least one of a plurality of network ports. The router 41 may also modify the incoming message before repeating it, such as in the known method of network address translation (NAT).

The load balancer 40 and router 41 may be disposed in series or in connection with an acceleration engine 42 (described in further detail below with reference to FIG. 3). In general, the acceleration engine 42 stores, retrieves, and updates context data. It is important to note that the acceleration engine 42 is operatively disposed between the network 20 (or a network access point (not shown)) and the plurality of web servers 44, 46, 48. In such a manner, the acceleration engine 42 may "intercept" messages between user computers 12, 14, 16, 18 and web servers 44, 46, 48. More particularly, the acceleration engine 42 may analyze an incoming page request to determine whether the request references particular context data, in which case, the acceleration engine 42 may asynchronously send the referenced context data to the web server 44, 46, or 48 to which the request is sent (as used herein, the transmission of context data to/from the web servers 44, 46, 48 is said to be "asynchronous" in that context data is sent independent of, although possibly concurrently with, a page request or response message). Moreover, the acceleration engine 42 may asynchronously receive context data updates from one or more of the web servers 44, 46, 48 and update the appropriate context data stored in or by the acceleration engine 42.

The connection of the acceleration engine 42 with the router 41 may vary. In one or more embodiments, the acceleration engine 42 may operate using the same physical hardware (such as processor, network ports, electronic storage) as the router 41. In one or more other embodiments, the acceleration engine 42 may share some physical hardware (such as enclosure, power supply, and network ports) but not certain other physical hardware (such as processor and electronic storage). In one or more other embodiments, the acceleration engine 42 may not share any physical hardware with the router 41, but still may be connected in series to at least one router 41.

In one or more embodiments with multiple routers 41, the acceleration engine 42 may be joined to any one of the routers 41 so long as the placement operatively disposes the acceleration engine 42 in the data path between the web servers 44, 46, 48 and the network 20. According to one or more embodiments, multiple acceleration engines may be implemented and connected either in series or parallel in the data path between a web server and a network. In one or more embodiments, when multiple routers 41 are implemented hierarchically, the acceleration engine 42 may be adjoined to the router 41 with the highest position in the hierarchy of those routers 41 connected to web servers 44, 46, 48.

As described above, the acceleration engine 42 may be adjoined to the router 41 in various ways. In one or more embodiments, the acceleration engine 42 may not share any physical hardware with the router 41. In such a case, the load balancer 40, router 41, and acceleration engine 42 may be connected in various configurations. For example, the load balancer 40 may be placed in series before the acceleration engine 42, and the router 41 may be connected in series with the load balancer 40 and the acceleration engine 42 in any order. In such an arranegement, the load balancer 40 may be connected between the network 20 and the acceleration engine 42. At least one reason for such an arrangement (load balancer 40 before the acceleration engine 42) will be understood from the description below—namely, that for an asynchronous message exchange, a destination web server address may be needed in order to send context data to the correct web server.

The load balancer 40, router 41, acceleration engine 42, and web servers 44, 46, 48 may be part of a local area network (LAN). For example, these components may be located within and administered by a particular organization (e.g., a company, government entity). However, it is entirely possible that one or more of these components may be remotely located from another component. In such cases, remotely located components may be connected over a wide area network as opposed to by a local area network.

Figure 3:
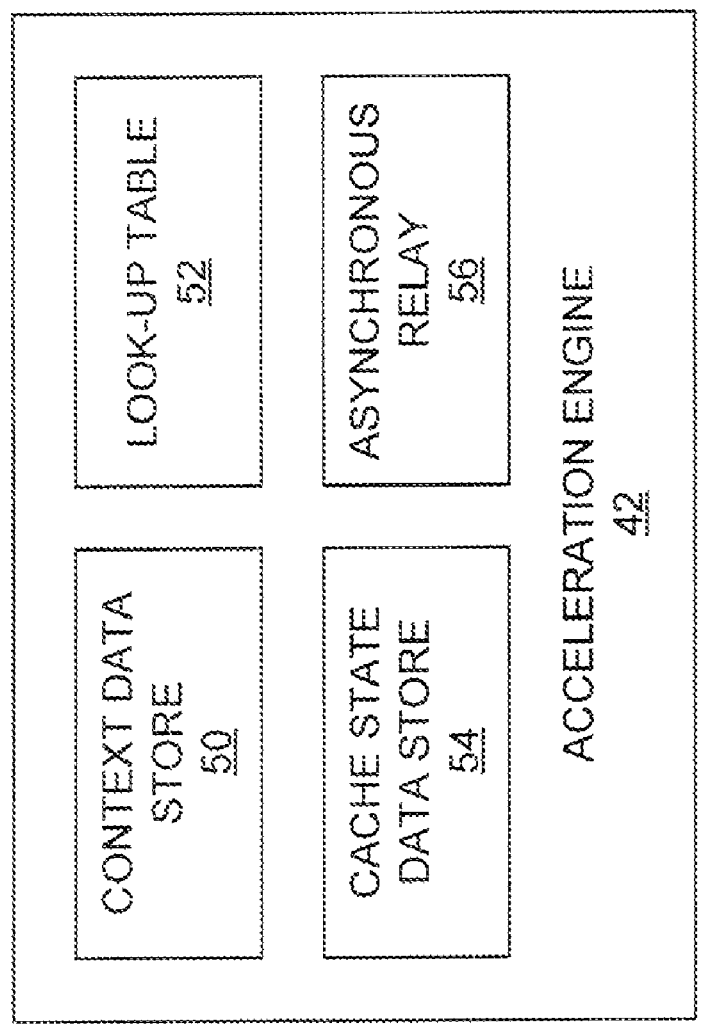
FIG. 3 shows a network messaging acceleration engine in accordance with an embodiment of the present invention.

FIG. 3 shows the acceleration engine 42 in accordance with an embodiment of the present invention. As described above, the acceleration engine 42 includes a context data store 50. The context data store 50 is capable of storing, retrieving, and updating context data on the basis of some index data or other reference information. In other words, context data in the context data store 50 is referenced by index data provided to or obtained by the acceleration engine 42. Further, the function of the context data store 50 may be performed by any device capable of storing, updating, and retrieving a segment of data.

Reference to particular context data in the context data store 50 may be made via use of a look-up table 52. The look-up table 52 may be used to match information extracted from an incoming intercepted page request to particular context data. Those skilled in the art will note that various types of known look-up tables and name-value pair indexing techniques may be used. For example, in one or more embodiments, a look-up mechanism may be supported by an indexed-based (e.g., a B-tree structure), in-memory table. Further, it is noted that such look-up data may be shared or replicated among more than one device.

The acceleration engine 42 further includes a data store 54 that stores information regarding the state of context data caches in the web servers 44, 46, 48. Use and operation of the data store 54 is described in further detail below with reference to FIG. 7.

When an incoming page request is intercepted by the acceleration engine 42, the acceleration engine 42 inspects the page request for relevant index data and then uses any such index data to look up context data in the context data store 50. If and when the referenced context data is found, the context data is sent to the destination web server by an asynchronous relay module 56. As discussed above, as used herein, the term "module" refers to any program, logic, and/or functionality implemented in hardware, software, and/or firmware. The asynchronous relay module 56 "asynchronously" sends the context data in that the context data is not sent as part of the request message forwarded to the destination web server. Thus, in such a manner, the request message is inspected, but not modified, by the acceleration engine 42, and should context data be needed to process the request message, such context data is asynchronously sent. The asynchronous relay module 56 may send context data using, for example, an "out-of-band" TCP/IP socket connection. In one or more other embodiments, the asynchronous relay module 56 may send context data using a point-to-point connection between the acceleration engine 42 and the destination web server.

Figure 4:
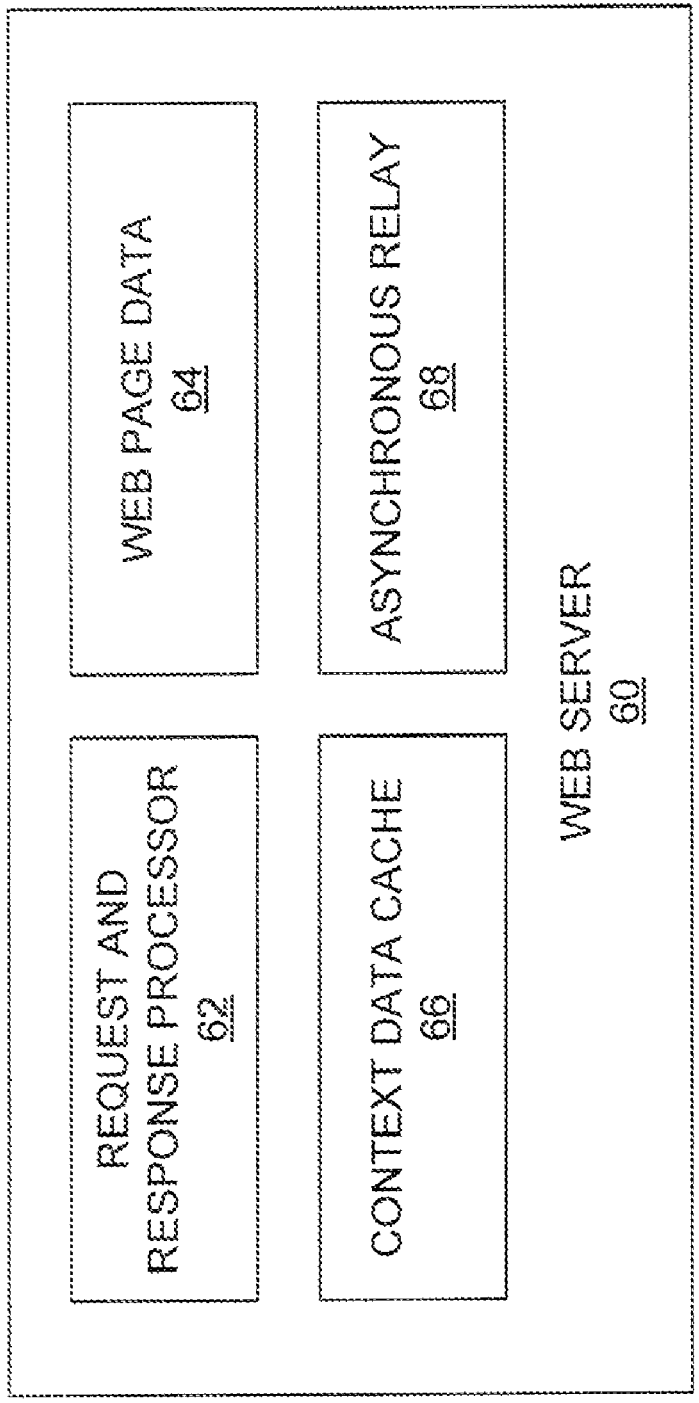
FIG. 4 shows a web server in accordance with an embodiment of the present invention.

FIG. 4 shows a web server 60 in accordance with an embodiment of the present invention. The web server 60 is representative of any of the web servers 44, 46, 48 shown in FIG. 2. The web server 60 includes a request and response processor 62 that is responsible for processing an incoming request and generating the appropriate response, which is generally in the form of a requested web page. Processing an incoming request may initially involve synchronizing that request with its context data as asynchronously sent from the acceleration engine 42. Further, once the request and any associated context data has been synchronized at the web server 60, the request and response processor 62 accesses web page data 64 to generate a response (e.g., build/return a web page).

Moreover, the web server 60 has a context data cache 66 that the request and response processor 62 may access for context data in the case that the context data cache 66 has a latest "up-to-date" copy of needed context data. As further described below with reference to FIG. 7, in the case that the context data cache 66 has an up-to-date copy of needed context data, the acceleration engine 42 may not send any such context data to the web server 60.

While generating the response message, the request and response processor 62 may itself generate context data for the specific user or user computer that initiated the incoming page request. In this case, the generated context data may be sent for storage to the acceleration engine 42 by an asynchronous relay module 68. The transmission of this context data to the acceleration engine 42 is said to be "asynchronous" because the context data is sent independent of the response message. The asynchronous relay module 68 may send the context data using, for example, an "out-of-band" TCP/IP socket connection. In one or more other embodiments, the asynchronous relay module 68 may send the context data using a point-to-point connection between the web server 60 and the acceleration engine 42.

Figure 5:
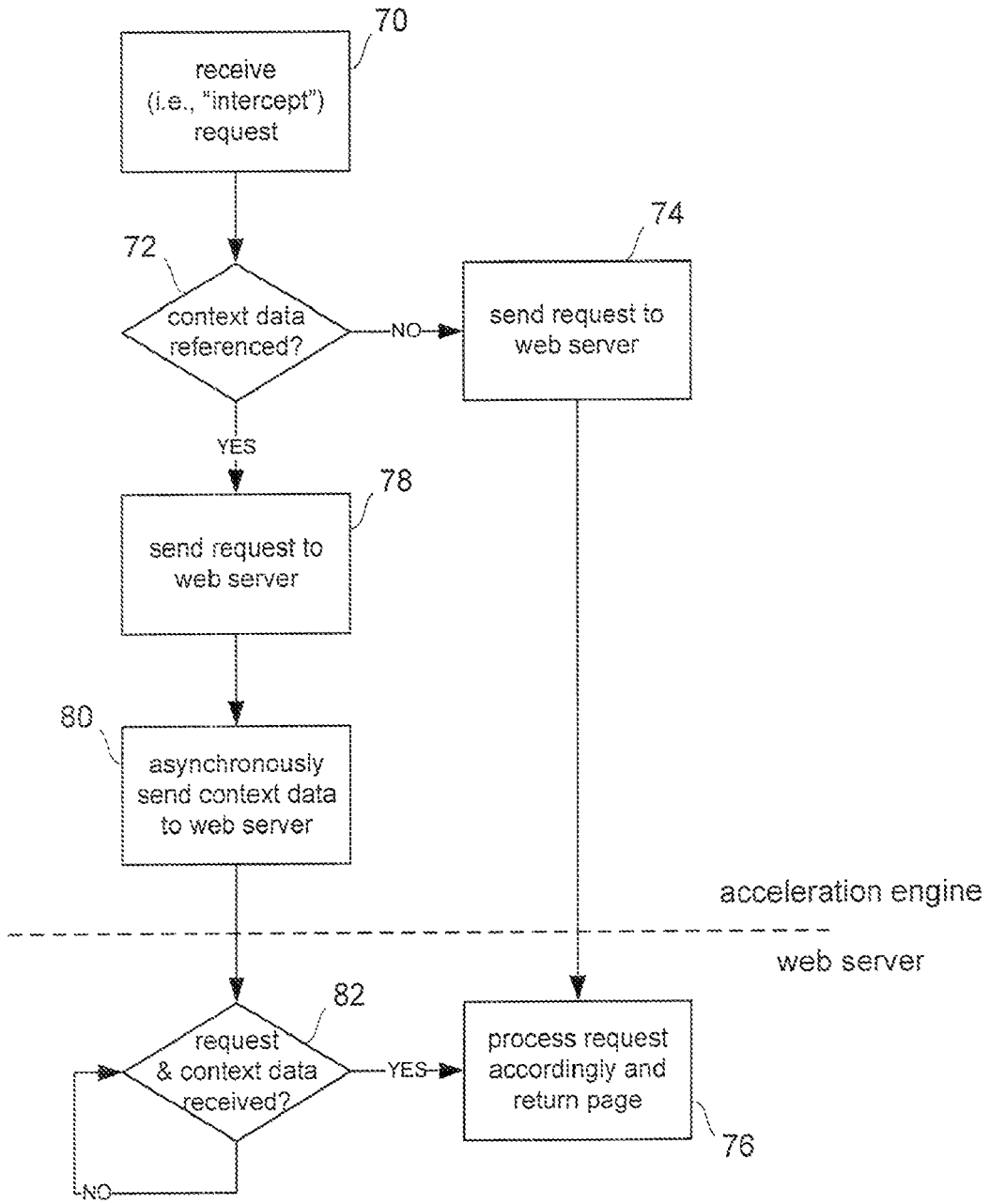
FIG. 5 shows a flow process in accordance with an embodiment of the present invention.

FIG. 5 shows a flow process in accordance with an embodiment of the present invention. Particularly, FIG. 5 shows a process for handling an incoming page request. In step 70, the acceleration engine 42 intercepts the incoming page request. In one or more embodiments, the acceleration engine 42 may be configured to intercept all incoming page requests. By "intercept", it is meant that the acceleration engine 42 inspects or somehow reads data from the incoming page request.

Based on the inspection of the incoming page request by the acceleration engine 42, a determination is made, in step 72, as to whether the incoming page request references any context data. Such reference may be made via index data stored in the request message. Alternatively, there may be other information in the request message that may be used to reference context data via, for example, the look-up table 52.

If in step 72, it is determined that the incoming page request does not reference any context data, the request, in step 74, is forwarded to an appropriate web server (as determined by, for example, the load balancer 40). The web server receiving the request then, in step 76, processes the request and returns the appropriate web page.

However, if in step 72, it is determined that the incoming page request does reference context data, the acceleration engine 42, in step 78, goes ahead and sends the request to an appropriate web server. In addition, in step 80, the acceleration engine 42 asynchronously sends the referenced context data to the web server to which the request was sent in step 78. In general, the context data is said to be sent "asynchronously" in that the context data is not made part of the request message sent to the web server. Such asynchronous communication of the context data may nonetheless be contemporaneous or concurrent with the request message sent to the web server. Further, it is noted that in one or more embodiments, the asynchronous transmission of context data by the acceleration engine 42 may be conditional in that if the web server already has an updated copy of the needed context data, then the transmission of the context data from the acceleration engine 42 may be avoided.

In step 82, the web server waits for reception of both the request forwarded on by the acceleration engine 42 and the context data retrieved and sent by the acceleration engine 42. Once both are received, they are synchronized (i.e., associated) with each other, and in step 76, the web server uses the synchronized data to process the request and generate and return the requested web page.

Figure 6:
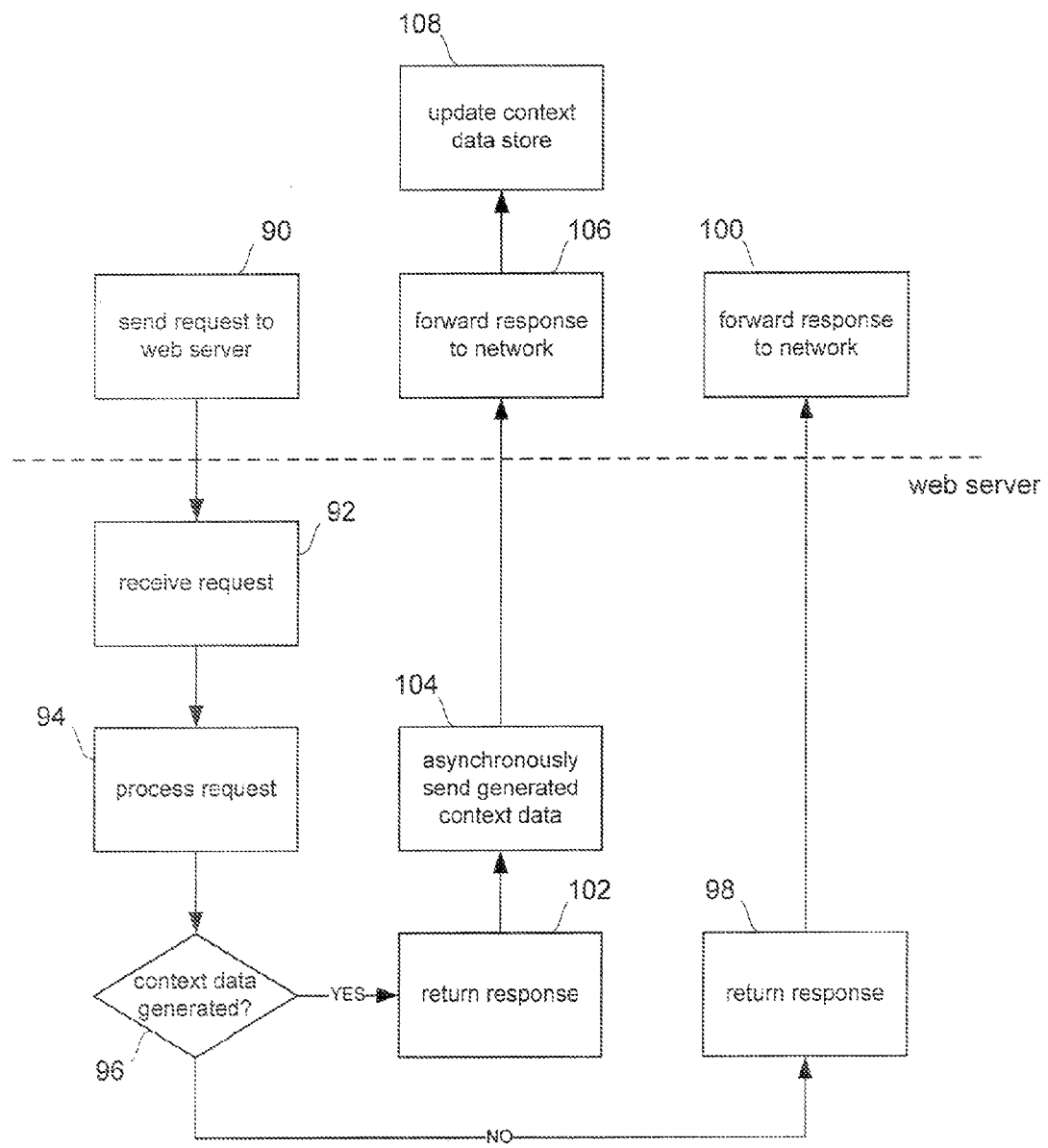
FIG. 6 shows a flow process in accordance with an embodiment of the present invention.

FIG. 6 shows a flow process in accordance with an embodiment of the present invention. Initially, in step 90, a request message is sent to a web server. The web server, in steps 92 and 94, receives and processes the request. As described above with reference to FIGS. 4 and 5, processing a request may be dependent on context data asynchronously sent from the acceleration engine 42.

In step 96, a determination is made as to whether any new or updated context data was generated as a result of processing the request in step 94. If no new or update context data was generated, then, in step 98, the appropriate response (e.g., HTTP response, web page) is returned. The response message is then forwarded, in step 100, back to the network 20 for delivery to the user computer responsible for the request causing the generation of the response. Thus, it is noted that in one or more embodiments, the response is sent back to the user computer without interception or inspection by the acceleration engine 42.

If it is determined in step 96 that context data was generated in response to processing the request in step 94, the process, in step 102 goes ahead and returns the appropriate response, which is subsequently forwarded, in step 106, back to the network 20 for delivery to the user computer responsible for the request causing the generation of the response. Additionally, in step 104, the newly generated or updated context data is asynchronously sent to the acceleration engine 42. Upon receipt of the asynchronously sent context data, the acceleration engine 42, in step 108, accordingly updates its context data store 50. It is important to note that even in the case where context data is generated during processing of an incoming page request, it is not necessary for the acceleration engine 42 to intercept or inspect response messages from the web server. However, in one or more embodiments, a response message from the web server may be intercepted or inspected by the acceleration engine 42.

Figure 7:
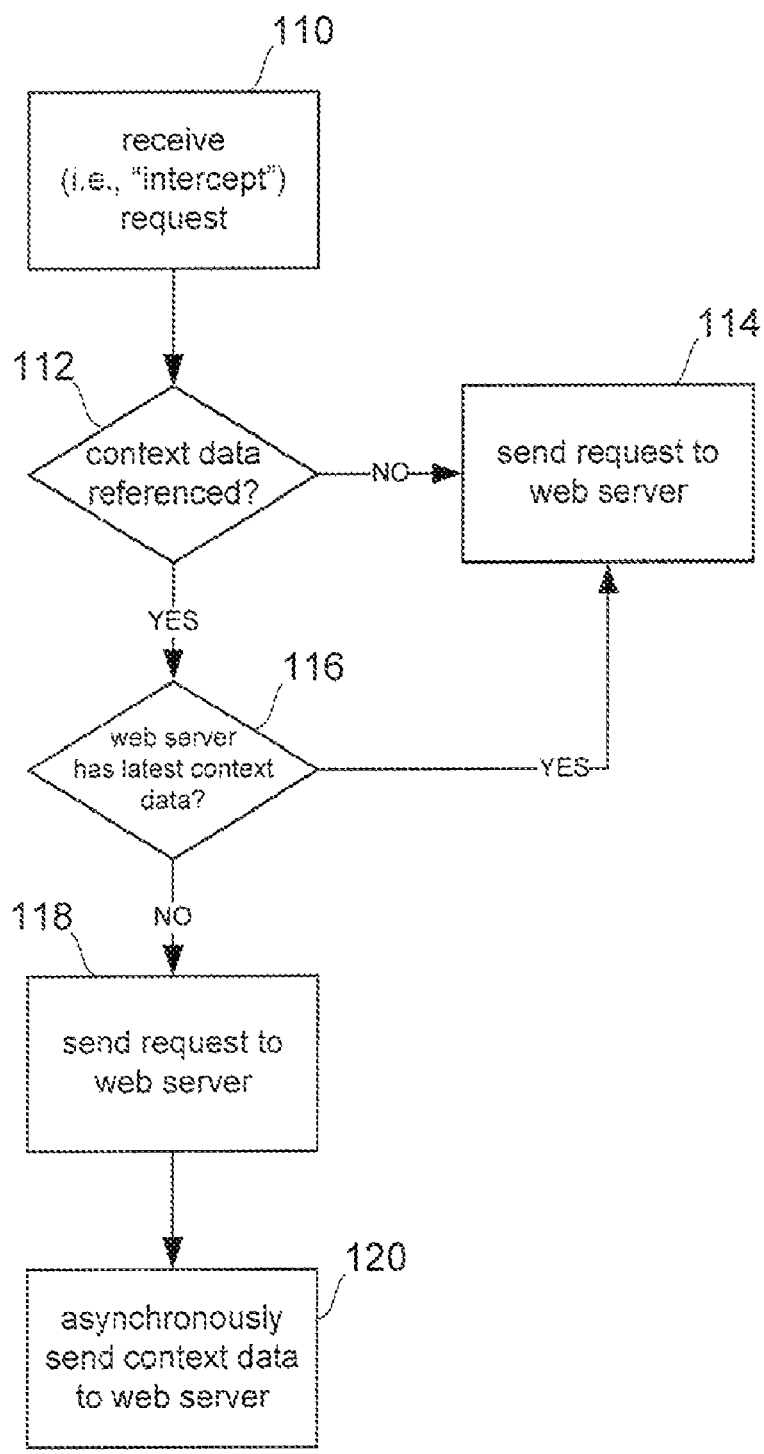
FIG. 7 shows a flow process in accordance with an embodiment of the present invention.

FIG. 7 shows a flow process in accordance with an embodiment of the present invention. Initially, in step 110, the acceleration engine 42 intercepts an incoming page request. Then, in step 112, a determination is made as to whether the request message indexes or references context data. If context data is referenced, then, in step 116, a determination is made as to whether the web server has the correct (i.e., latest) context data. Otherwise, if there is no context data referenced, then, in step 114, the request message is sent to the appropriate web server for processing.

As described above, in step 116, the acceleration engine 42 determines whether the web server to which the request is destined has a latest "up-to-date" copy of the context data. This determination may be made based on cache state information maintained in the data store 54. The data store 54 stores information regarding the state of the context data caches in the web servers operatively connected to the acceleration engine 42.

If it is determined in step 116 that the destination web server has the latest copy of the context data, the request is sent to the web server, and there is no need to asynchronously send any context data because the web server already has the latest copy of the needed context data. However, if it is determined that the web server does not have an up-to-date copy of the context data, the context data is retrieved by the acceleration engine 42, and the request and retrieved context data, in steps 118 and 120, are asynchronously sent to the web server.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. Accordingly, the scope of the present invention should be limited only by the appended claims.

What is claimed is:

1. In a network architecture comprising at least two servers and an acceleration engine, a method for handling network messages, comprising:
   receiving, at the acceleration engine, context data from a first server;
   storing the context data in a data store associated with the acceleration engine;
   at the acceleration engine, intercepting a request message intended for at least one of the servers;
   at the acceleration engine, determining whether the intercepted request message references context data;
   forwarding the intercepted request message from the acceleration engine to a second server;
   in response to a determination that the intercepted request message references context data:
      retrieving, by the acceleration engine, the stored context data from the data store and sending the context data from the acceleration engine to the second server; and
      at the second server:
         associating the request message with the context data; and
         generating a response message based on the associated request message and context data;
   wherein the sending of the context data to the second server is performed separately from and independently of the forwarding of the intercepted request message to the second server.

2. The method of claim 1, wherein the intercepted request message comprises a web page request.

3. The method of claim 1, wherein the response message comprises a web page.

4. The method of claim 1, wherein determining whether the request message references context data occurs without modification of the request message, and wherein the request message forwarded to the second server is identical to the request message intercepted at the acceleration engine.

5. The method of claim 1, wherein the intercepted request message comprises at least one of a user datagram protocol (UDP) message, a hypertext transport protocol (HTTP) message, a transmission control protocol (TCP) message, a secured hypertext transport protocol (HTTPS) message.

6. The method of claim 1, wherein receiving, at the acceleration engine, context data from a first server is performed separately from and independently of receiving any response message at the acceleration engine.

7. In a network architecture comprising at least two servers and an acceleration engine, a method for handling network messages, comprising:
   receiving, at the acceleration engine, context data from a first server;
   storing the context data in a data store associated with the acceleration engine;
   at the acceleration engine, intercepting a request message intended for at least one of the servers;
   at the acceleration engine, determining whether the intercepted request message references context data;
   forwarding the intercepted request message from the acceleration engine to a second server;
   determining whether the second server has an updated copy of the context data; and
   in response to a determination that the request message references context data and that the second server does not have an updated copy of the context data:
      retrieving, by the acceleration engine, the stored context data from the data store and sending the context data from the acceleration engine to the second server; and
      at the second server:
         associating the request message with the context data; and
         generating a response message based on the associated request message and context data;
      wherein the sending of the context data to the second server is performed separately from and independently of the forwarding of the intercepted request message to the second server.

8. The method of claim 7, wherein receiving, at the acceleration engine, context data from a first server is performed separately from and independently of receiving any response message at the acceleration engine.

9. In a network architecture comprising at least two servers and an enhanced network module, a method for handling network messages comprising:
   receiving, at the enhanced network module, context data from a first server;
   storing the context data in a data store associated with the enhanced network module;
   at the enhanced network module, intercepting a request message intended for at least one of the servers;
   at the enhanced network module, inspecting the intercepted network message and forwarding the intercepted network message to a second server;
   at the enhanced network module, in response to the inspection, determining whether the intercepted network message references context data; and
   in response to a determination that the network message references context data:
      retrieving, by the enhanced network module, the context data from the data store and sending the context data from the enhanced network module to the second server; and
      at the second server:
         associating the network message with the context data; and
         generating a response message based on the associated network message and context data;
   wherein the sending of the context data to the second server is performed separately from and independently of the forwarding of the intercepted network message to the second server.

10. The method of claim 9, wherein the enhanced network module is operatively connected to a TCP/IP router.

11. The method of claim 9, wherein the intercepted network message comprises at least one of a user datagram protocol (UDP) message, a hypertext transport protocol (HTTP) message, a transmission control protocol (TCP) message, and a secured hypertext transport protocol (HTTPS) message.

12. The method of claim 9, wherein the intercepted network message comprises a web page request.

13. The method of claim 9, wherein the context data is retrievable by index data in the network message.

14. The method of claim 13, wherein the index data is stored in one of an HTTP-post hidden form field, an ASP.NET View State fields, and an URL query string.

15. The method of claim 9, further comprising:
at the enhanced network module, receiving context data from the second server; and
updating the data store with the received context data.

16. The method of claim 9, wherein intercepting the network message comprises receiving the network message from a user computer.

17. The method of claim 9, wherein inspecting the intercepted network message occurs without modification of the network message.

18. The method of claim 9, wherein receiving, at the enhanced network module, context data from a first server is performed separately from and independently of receiving any response message at the enhanced network module.

19. In a network architecture comprising at least two servers and an enhanced network module, a method for handling network messages, comprising:
receiving, at the enhanced network module, context data from a first server;
storing the context data in a data store associated with the enhanced network module;
at the enhanced network module, intercepting a network message intended for at least one of the servers;
at the enhanced network module, inspecting the intercepted network message and forwarding the intercepted network message to a second server;
at the enhanced network module, in response to the inspection, determining whether the intercepted network message references context data and whether the second server has an updated copy of the context data; and
in response to a determination that the intercepted network message references context data and that the second server does not have an updated copy of the context data:
retrieving, by the enhanced network module, the stored context data from the data store and sending the context data from the enhanced network module to the second server; and
at the second server:
associating the network message with the context data; and
generating a response message based on the associated network message and context data;
wherein the sending of the context data to the second server is performed separately from and independently of the forwarding of the intercepted network message to the second server.

20. The method of claim 19, wherein receiving, at the enhanced network module, context data from a first server is performed separately from and independently of receiving any response message at the enhanced network module.

21. A system for handling network messages, comprising:
a network;
at least two servers operatively connected to the network; and
an acceleration engine operatively disposed between the network and the servers, wherein the acceleration engine comprises:
a data store, for storing context data received from a first server;
a first module arranged to intercept a request message addressed to a second server, and to inspect the intercepted request message,
a second module arranged to forward the intercepted request message to the second server,
a third module arranged to conditionally retrieve context data from the data store in response to the inspection of the intercepted request message, and
a fourth module arranged to conditionally send the context data to the second server in a manner that is performed separately from and independently of the forwarding of the intercepted request message to the second server;
wherein the second server comprises:
a synchronization module arranged to associate the forwarded request message with the context data; and
a processing module arranged to generate a response message based on the associated request message and context data.

22. The system of claim 21, wherein the intercepted request message comprises a web page request.

23. The system of claim 21, wherein the first module is further arranged to inspect the intercepted request message without modification of the intercepted request message.

24. The system of claim 21, wherein the intercepted request message comprises at least one of a user datagram protocol (UDP) message, a hypertext transport protocol (HTTP) message, a transmission control protocol (TCP) message, and a secured hypertext transport protocol (HTTPS) message.

25. The system of claim 21, wherein the acceleration engine further comprises:
a fifth module arranged to determine whether the second server has an updated cache copy of the context data;
and wherein the fourth module sends the context data to the second server responsive to a determination by the fifth module that the second server does not have an updated cache copy of the context data.

26. The system of claim 21, wherein the second server further comprises:
a relay module arranged to send to the acceleration engine context data newly generated in response to the generation of the response message.

27. The system of claim 21, wherein the acceleration engine is operatively connected to a TCP/IP router.

28. The system of claim 21, wherein the acceleration engine further comprises:
a fifth module arranged to update the data store in response to receiving context data from at least one of the servers.

29. The system of claim 21, wherein the acceleration engine receives context data from the first server separately from and independently of receiving any response message at the acceleration engine.

30. A computer program product for handling network messages in a network architecture comprising at least two servers and an acceleration engine, the computer program product comprising:

a non-transitory computer-readable storage medium;
computer program code, encoded on the medium, configured to cause at least one processor of the acceleration engine to perform the steps of:
- receiving context data from a first server;
- storing the context data in a data store associated with the acceleration engine;
- intercepting a request message intended for at least one of the servers;
- determining whether the intercepted request message references context data;
- forwarding the intercepted request message from the acceleration engine to a second server; and
- in response to a determination that the intercepted request message references context data:
  - retrieving the stored context data from the data store and sending the context data from the acceleration engine to the second server; and computer program code, encoded on the medium, configured to cause at least one processor of the second server to perform the steps of:
- associating the request message with the context data; and
- generating a response message based on the associated request message and context data;

wherein the computer program code configured to cause at least one processor to send the context data to the second server is configured to send the context data separately from and independently of the forwarding of the intercepted request message to the second server.

31. The computer program product of claim 30, wherein the intercepted request message comprises a web page request and the response message comprises a web page.

32. The computer program product of claim 30, wherein the computer program code configured to cause at least one processor to determine whether the request message references context data is configured to operate without modification of the request message, and wherein the request message forwarded to the second server is identical to the request message intercepted at the acceleration engine.

33. The computer program product of claim 30, wherein the intercepted request message comprises at least one of a user datagram protocol (UDP) message, a hypertext transport protocol (HTTP) message, a transmission control protocol (TCP) message, a secured hypertext transport protocol (HTTPS) message.

* * * * *